June 24, 1924.

F. F. VINDEMORE

MULTIPLYING CAMERA

Filed June 15, 1923    2 Sheets-Sheet 1

1,499,267

WITNESSES

INVENTOR
FREDERICK F. VINDEMORE
BY
ATTORNEYS

June 24, 1924.
F. F. VINDEMORE
1,499,267
MULTIPLYING CAMERA
Filed June 15, 1923
2 Sheets-Sheet 2
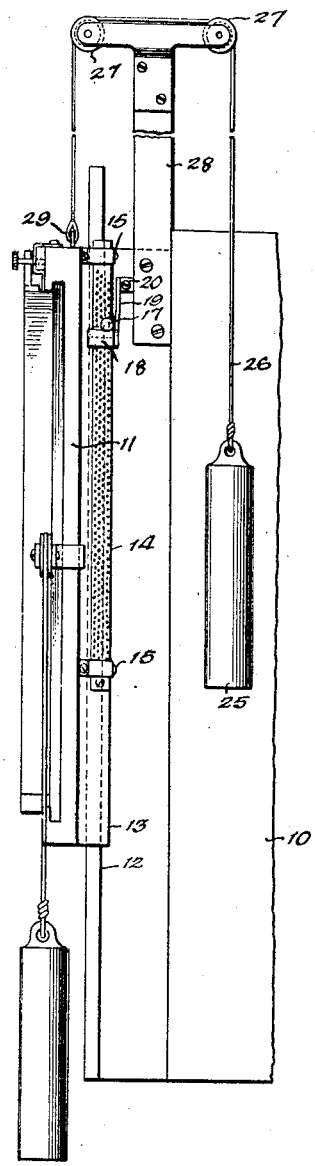
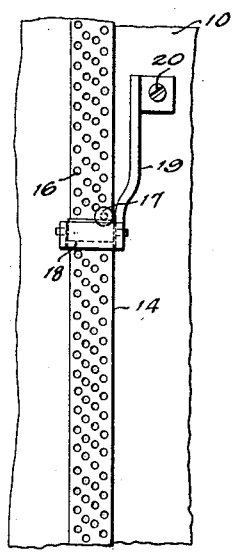
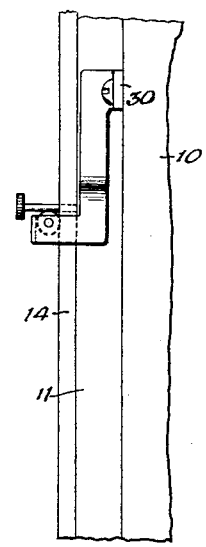
WITNESSES
INVENTOR
FREDERICK F. VINDEMORE
BY
ATTORNEYS Patented June 24, 1924.

1,499,267

UNITED STATES PATENT OFFICE.

FREDERICK F. VINDEMORE, OF NEW YORK, N. Y.

MULTIPLYING CAMERA.

Application filed June 15, 1923. Serial No. 645,683.

*To all whom it may concern:*

Be it known that I, FREDERICK F. VINDEMORE, a citizen of the United States of America, and a resident of the city of New York, borough of Manhattan, in the county and State of New York, have invented a new and Improved Multiplying Camera, of which the following is a description.

My invention relates to cameras and particularly to a camera for producing repeats of an object on the photographic plate. More particularly the invention has in mind an attachment for cameras for use in photographing matter for the production of etched machine plates which are formed first by producing a negative and then photographically printing from the negative on a zinc plate, etching the matter on the zinc plate and then severing the same to produce the individual machine plates. It is highly important in photographing for the purpose referred to that repeats of the object be parallel and in alinement so that the etched plate may be severed and the plates separated into the separate machine plates with accuracy and with the minimum waste of material.

The general object of my invention is to provide a simple attachment for cameras which may be optionally operated whereby the back plate may be caused to move vertically step by step an equal predetermined distance after each exposure to thus produce a vertical line of repeats as well as to provide in association with the laterally movable plate holder on the back element means for similarly causing the plate holder to move step by step a given distance for the production of parallel vertical rows of the repeat.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 2 is a side elevation of the rear end of a camera having applied thereto my improved means for giving a vertical step-by-step movement to the camera back carrying the laterally movable plate holder;

Figure 3 is an enlarged face view of a portion of my attachment;

Figure 4 is an elevation of the parts shown in Figure 3 but at right angles to said Figure 3;

Figures 5 and 6 are side elevations of different forms of pins that may be employed in carrying out my invention.

Figure 1:
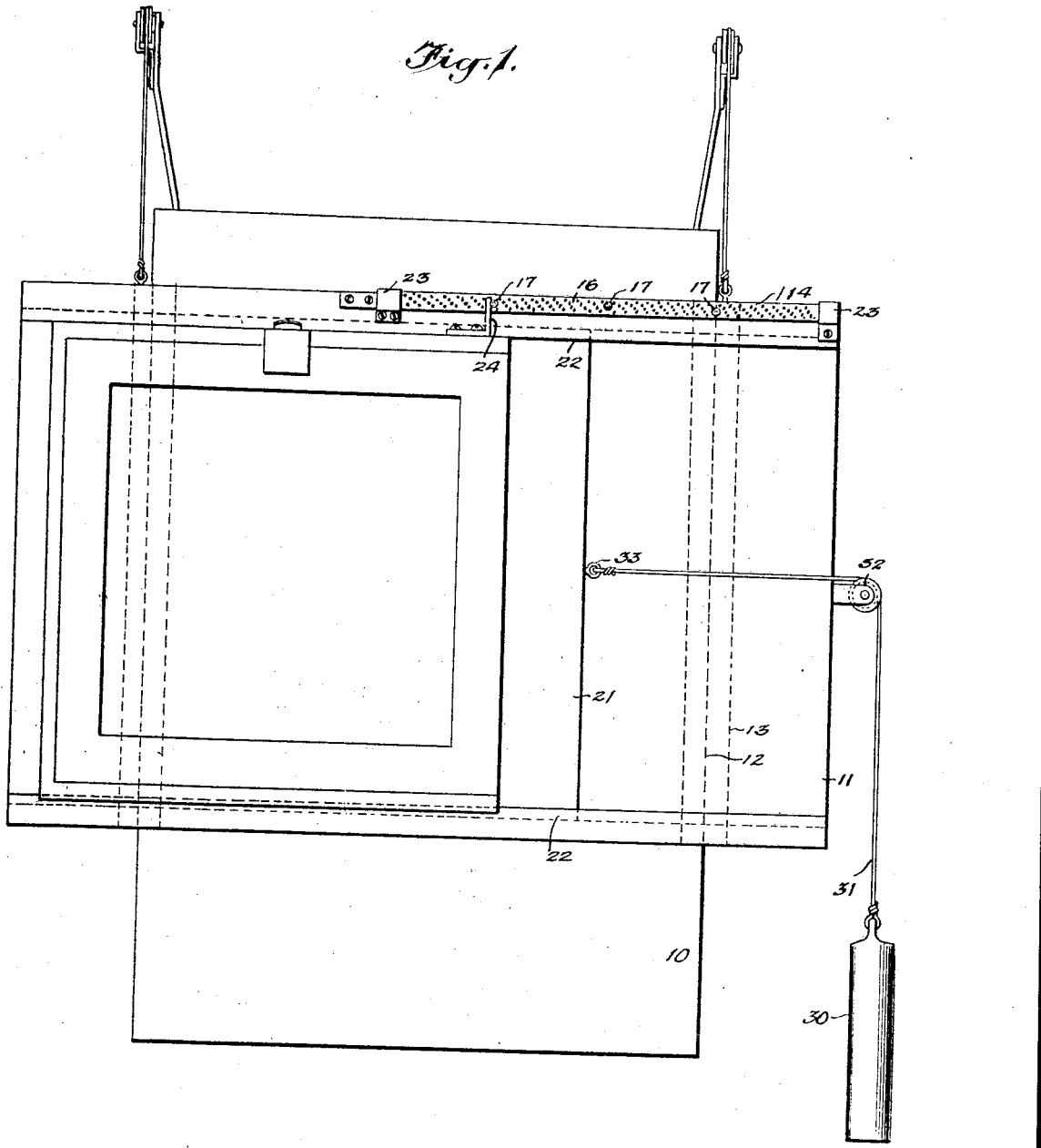
Figure 1 is a rear elevation of a camera equipped with my improved means for effecting predetermined step-by-step lateral movement of the plate holder.

In the illustrated example the numeral 10 indicates a portion of a camera and the numeral 11 the back element thereon which as usual has vertical movement on the camera, the numerals 12 and 13 indicating known guide elements respectively on the camera and said back element.

In accordance with my invention I provide a preferably flat bar 14 secured to the back element 11 by a suitable fastener means indicated at 15. Said bar 14 is formed with at least one vertical series of holes 16, disposed equal distances apart. Advantageously, in practice, a plurality of vertical rows of holes 16 is produced in the bar 14 the holes of the respective rows being in staggered relation so as to give a finer adjustment as will appear. Any one of the holes 16 is adapted to receive a pin 17 or 117, a plurality of said pins being inserted in the bar 14. Thus, the bar 14 and the pins 17 or 117 inserted therein may all move vertically in unison on a camera 10. A stop 18 of any suitable form is provided on the camera, said stop in the example shown being formed on a bracket 19 secured as at 20 to the camera 10. The stop 18 lies adjacent to the bar 14, to lie in the path of the pin 17.

In practice a vertical series of pins is inserted in the bracket 19 at equal distances apart, the distance being determined by the size of the repeat to be produced on the photographic plate.

In use the back element 11 is raised to the full height and the series of pins will then all be disposed above the stop 18 with the lowermost pin resting on said stop whereupon by pulling out of the lowermost pin the back element 11 will drop to the next pin above to be arrested by the stop 18, the pins being spaced a given distance apart. The element 11 will drop the predetermined distance and thus will gravitate by a step-by-step movement after each exposure.

The numeral 21 indicates the plate holder movable laterally on the usual upper and lower guides 22 on the camera back element 11. I provide on the rear face of the camera back 11 a bar 114 corresponding with the bar 14 and provide the described pins 17 or 117 to be inserted in the said bar. The bar 114 has pin holes 16 the same as in the bar 14 as referred to. Said bar 114 is secured by any suitable holding means 23 to the back element 11. On the plate holder 21 an upstanding stop member 24 rises a height to lie in the path of the pins 17. Upon removing the pins 17 in succession from the bar 114 the stop 24 will successively engage the pins and thereby will move laterally predetermined distances by a step-by-step movement.

I may in practice partially balance the weight of the back element 11 by a weight 25 suspended on a flexible element 26 running over sheaves 27 on a standard 28 on the camera 10, said flexible element connecting as at 29 with element 11. Also, I may employ a weight 30 suspended by a flexible element 31 running over a sheave 32 and connecting as at 33 with the plate holder 21 for automatically shifting the plate holder as the pins 17 are successively withdrawn.

Comparing Figures 5 and 6 it will be observed that the pin 17 of Figure 5 has a uniform diameter while the pin 117, Figure 6, is of two diameters so as to be inserted by its smaller end in the bar 14 or 114, the large diameter of the pin 117 serving to make for a finer regulation of the distance between the inserted pins, that is to say, there will be a less distance between the two pins 117 inserted in given holes, spaced vertically, than there will be between two pins 17 inserted in the same holes. Thus, the movement of the back 11 or the plate holder 21 can be further varied.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A camera attachment for effecting a step-by-step movement of the photographic plate, said attachment comprising a pin bar and a stop attachable respectively to relatively fixed and movable members of the camera, said bar having pin holes and pins variably insertable in said holes to be engaged by said stop in succession as the pins are successively removed from the bar.

2. A camera attachment for effecting a step-by-step movement of the photographic plate, said attachment comprising a stop member, and a series of coacting stop members adapted to be disposed in a longitudinal series in line with the first stop member and optionally placeable to vary their distances apart, and removable in succession for the successive members of the series to engage the first-mentioned stop.

3. A camera attachment for use in alining repeat exposures, comprising coacting stop means attachable respectively to two members of the camera of which one member is movable relatively to the other for shifting the position of the photographic plate, one of said coacting stop means including plural elements optionally placeable to engage the other of the coacting means or optionally removable for the next one of said plural elements to engage said other coacting means.

4. A camera attachment for use in alining repeat exposures, said attachment comprising coacting stop means attachable respectively to a movable plate-carrying member of the camera and to a relatively fixed member of the camera, the one of said means including plural members optionally placeable or removable and adapted when emplaced in position to engage the other of said coacting stop means.

5. A camera attachment for effecting a step-by-step movement of a photographic plate, said attachment comprising a pin bar having a plurality of rows of pin holes, the holes of the respective rows being in staggered relation, stop means in the form of pins optionally insertable or removable in the holes of said bar, coacting stop means adapted to be disposed in line with the inserted pins to engage the successive pins as the latter are removed one at a time from the pin bar, and means to mount said bar with the stop pins thereof and the second stop means on relatively movable members of the camera.

6. The combination with a vertically movable camera back member and a plate holder movable laterally on said member, a weight connected with said vertically movable member, a second weight connected with said plate holder, and coacting stop means on the plate holder and on said vertical member, the one stop means being variable to engage the other stop means at spaced points for giving a step-by-step movement of the plate holder.

7. The combination with a vertically movable camera back member and a plate holder movable laterally on said back member, of coacting means on said vertical member and on said plate holder, the one of said stop means being variable to variously engage the other stop means for giving a step-by-step shifting movement to the plate holder.

8. The combination with a camera body, and a vertically movable back member, of a stop on said camera body, a vertically disposed pin bar on said back member formed with spaced pin holes, and a series of pins variously insertable in said pin bar or removable therefrom to cause engagement of the pins in succession with the stop member on the camera body.

FREDERICK F. VINDEMORE.